US010616537B2

(12) United States Patent
Chung et al.

(10) Patent No.: US 10,616,537 B2
(45) Date of Patent: Apr. 7, 2020

(54) ILLUMINATION SYSTEM AND PROJECTION APPARATUS

(71) Applicant: Coretronic Corporation, Hsin-Chu (TW)

(72) Inventors: Wen-Yen Chung, Hsin-Chu (TW); Chi-Hsun Wang, Hsin-Chu (TW); Wei-Min Chien, Hsin-Chu (TW); Te-Tang Chen, Hsin-Chu (TW); Shang-Hsuang Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/214,141

(22) Filed: Dec. 10, 2018

(65) Prior Publication Data

US 2019/0215498 A1    Jul. 11, 2019

(30) Foreign Application Priority Data

Jan. 10, 2018 (CN) .................... 2018 2 0037725 U (51) Int. Cl.
*G03B 21/20* (2006.01)
*H04N 9/31* (2006.01)
*G03B 33/08* (2006.01)

(52) U.S. Cl.
CPC ......... *H04N 9/3114* (2013.01); *G03B 21/204* (2013.01); *G03B 21/208* (2013.01); *G03B 33/08* (2013.01); *H04N 9/3161* (2013.01)

(58) Field of Classification Search
CPC .... G03B 21/204; G03B 33/08; G03B 21/208; H04N 9/3114

USPC .......................................................... 353/84
See application file for complete search history.

(56) References Cited

U.S. PATENT DOCUMENTS

| 2006/0007407 A1* | 1/2006 | Matsui | G02B 26/008 353/84 |
| 2006/0158898 A1* | 7/2006 | Cheng | H04N 9/3114 362/583 |
| 2013/0100417 A1* | 4/2013 | Yang | G03B 21/204 353/31 |

(Continued)

FOREIGN PATENT DOCUMENTS

| CN | 1930497 | 3/2007 |
| CN | 103062672 | 4/2013 |
| TW | I266141 | 11/2006 |

*Primary Examiner* — Ryan D Howard
(74) *Attorney, Agent, or Firm* — JCIPRNET (57) ABSTRACT

An illumination system including an excitation light source, a wavelength conversion element and a filter element is provided. The excitation light source is used for emitting an excitation beam. The wavelength conversion element has a wavelength conversion region. When the wavelength conversion region is cut into a transmission path of the excitation beam, the wavelength conversion region is excited by the excitation beam and emits a converted beam. A reference plane is perpendicular to the transmission path of the converted beam and is angled such that an acute angle is formed between the reference plane and the filter wheel which is disposed on a transmission path of the converted beam coming from the wavelength conversion element. The filter element allows a part of the converted beam to penetrate so as to output at least one color beam, and reflects another part of the converted beam.

18 Claims, 8 Drawing Sheets

(56) References Cited

U.S. PATENT DOCUMENTS

2017/0082912 A1* 3/2017 Wakabayashi ....... G02B 27/283

* cited by examiner

ILLUMINATION SYSTEM AND PROJECTION APPARATUS

CROSS-REFERENCE TO RELATED APPLICATION

This application claims the priority benefit of China application serial no. 201820037725.1, filed on Jan. 10, 2018. The entirety of the above-mentioned patent application is hereby incorporated by reference herein and made a part of this specification.

BACKGROUND OF THE INVENTION

Field of the Invention

The invention relates to an illumination system and a projection apparatus.

Description of Related Art

In a framework of a laser projector, generally, a blue laser light is applied to sequentially irradiate a phosphor layer and a reflection region of a phosphor wheel to output a yellow light and a blue light, and then a filter element in the projector is applied to extract a required color light from wide-waveband yellow light, and the extracted color light enters a light valve. However, the part of the un-extracted light is reflected by the filter element and transmitted back to the phosphor layer of the phosphor wheel along the coming path of the yellow light, and the phosphor layer may absorb the part of the un-extracted light, resulting in a temperature rise, which may further result in a conversion efficiency reduction of the phosphor layer due to heat. Further, if the projector is used for a long time, the temperature of the phosphor layer exceeds its affordable temperature range, and it may be burned black. The above situation may result in poor reliability of the projector, or even failure of the projector.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to an illumination system, which has good reliability and good optical efficiency.

The invention is directed to a projection apparatus, which has good reliability and good optical efficiency.

Other objects and advantages of the invention can be further illustrated by the technical features broadly embodied and described as follows.

In order to achieve one or a portion of or all of the objects or other objects, an embodiment of the invention provides an illumination system including an excitation light source, a wavelength conversion element and a filter element. The excitation light source is configured to emit an excitation beam. The wavelength conversion element has a wavelength conversion region. When the wavelength conversion region is cut into a transmission path of the excitation beam, the wavelength conversion region is excited by the excitation beam to emit a converted beam. The filter element is disposed on a transmission path of the converted beam coming from the wavelength conversion element. A reference plane is perpendicular to the transmission path of the converted beam, and the filter element and the reference plane are angled such that an acute angle is formed there between. The filter element allows a part of the converted beam to penetrate so as to output at least one color beam, and reflects another part of the converted beam.

In order to achieve one or a portion of or all of the objects or other objects, an embodiment of the invention provides a projection apparatus including the aforementioned illumination system, a light valve and a projection lens. The light valve is disposed on a transmission path of the at least one color beam coming from the illumination system, and is configured to convert the at least one color beam into an image beam. The projection lens is disposed on a transmission path of the image beam.

According to the above description, in the illumination system and the projection apparatus of the invention, since the transmission path of the converted beam is perpendicular to the reference plane and the reference plane and the filter element are angled such that the acute angle is formed there between, a part of the converted beam is reflected to somewhere else and is not easy to be transmitted back to the wavelength conversion region along the coming path of the converted beam. Through the above configuration, the wavelength conversion region is not easy to receive the converted beam reflected by the filter element, and the conversion efficiency thereof may be substantially avoided from decreasing resulted from undesirable heat. Therefore, the illumination system and the projection apparatus of the invention have good reliability and good optical efficiency.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. The drawings are not necessarily drawn to scale.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
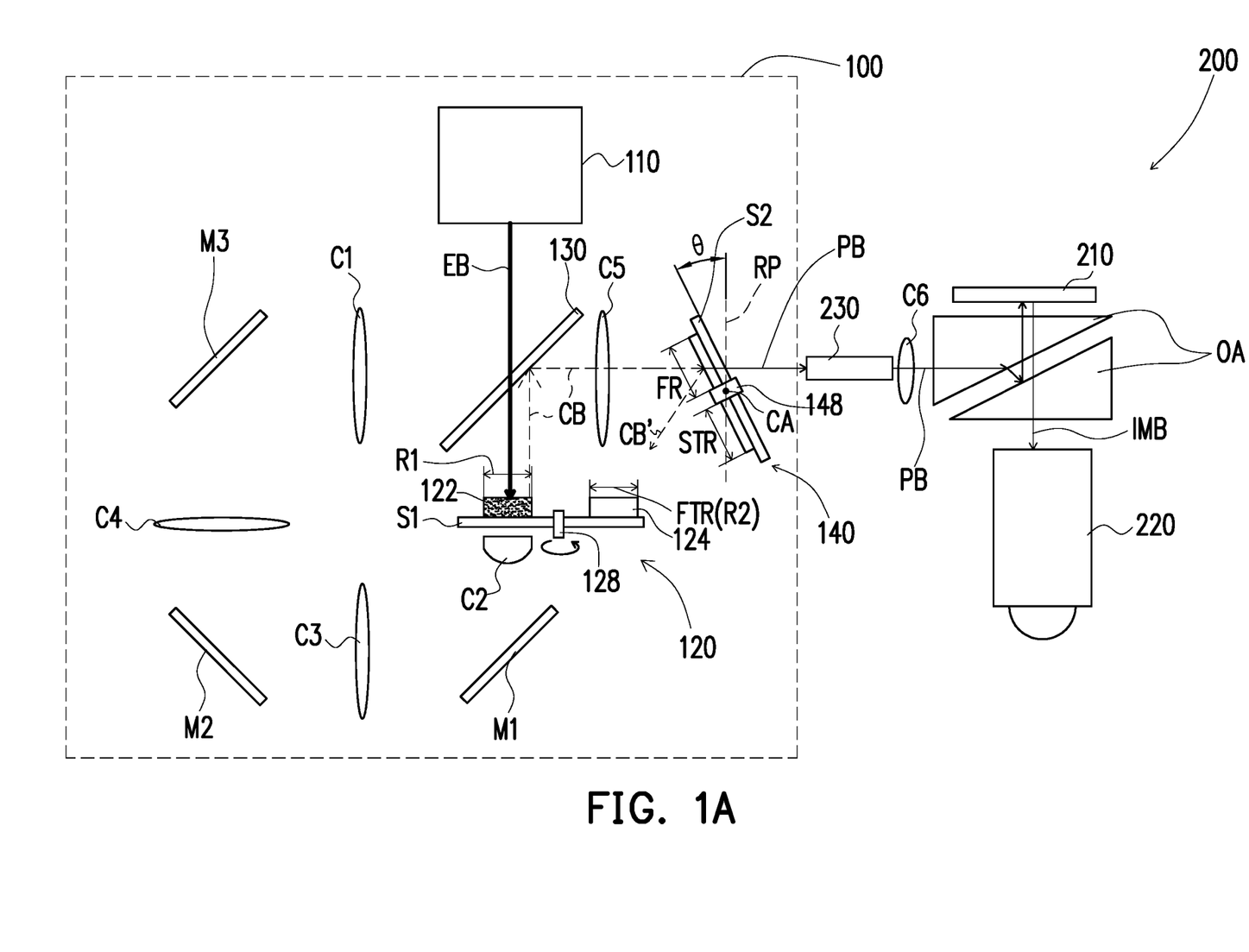
FIG. 1A is a schematic diagram of an optical path of a projection apparatus during a first time period according to an embodiment of the invention.
Figure 1B:
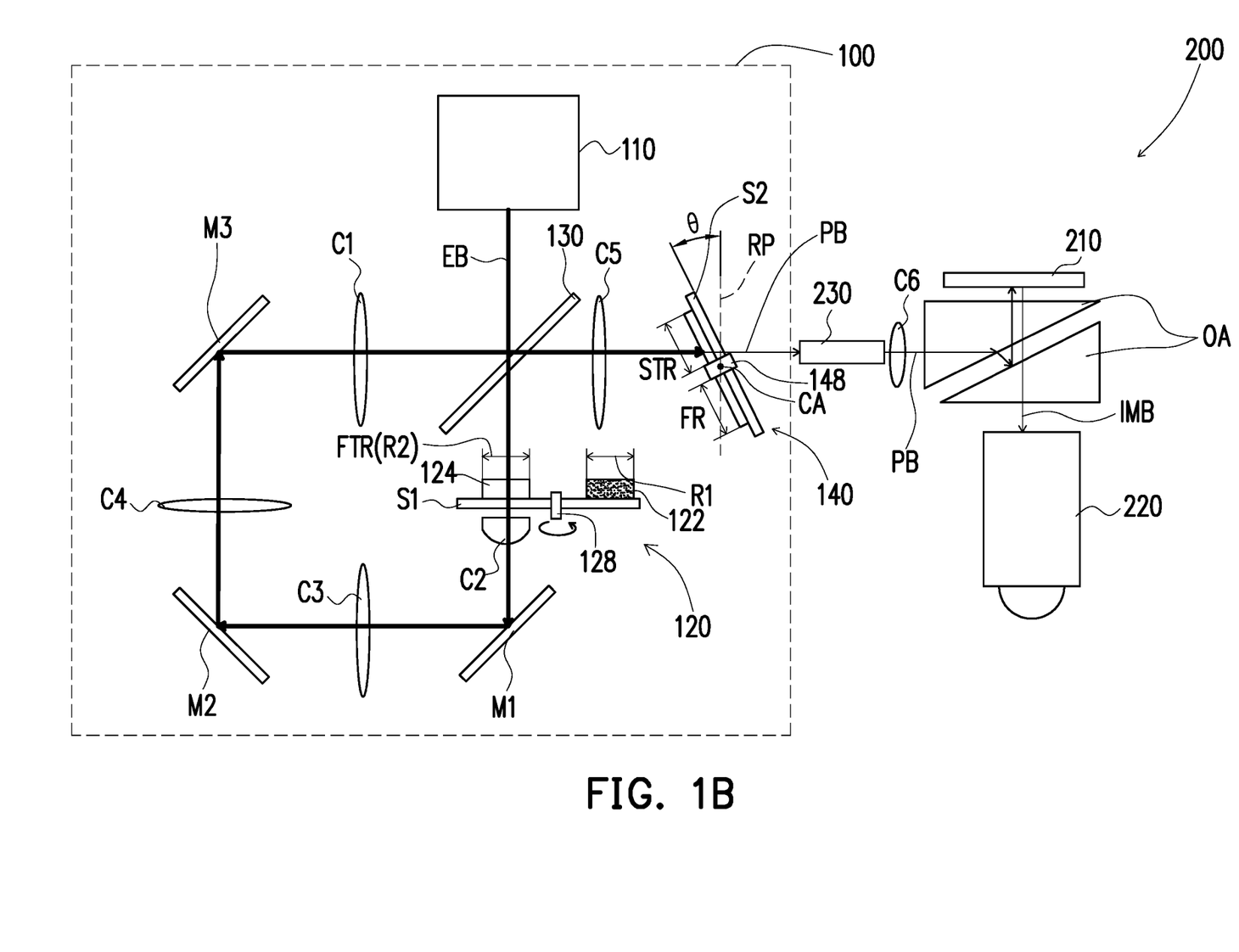
FIG. 1B is a schematic diagram of an optical path of the projection apparatus of FIG. 1A during a second time period.
Figure 2:
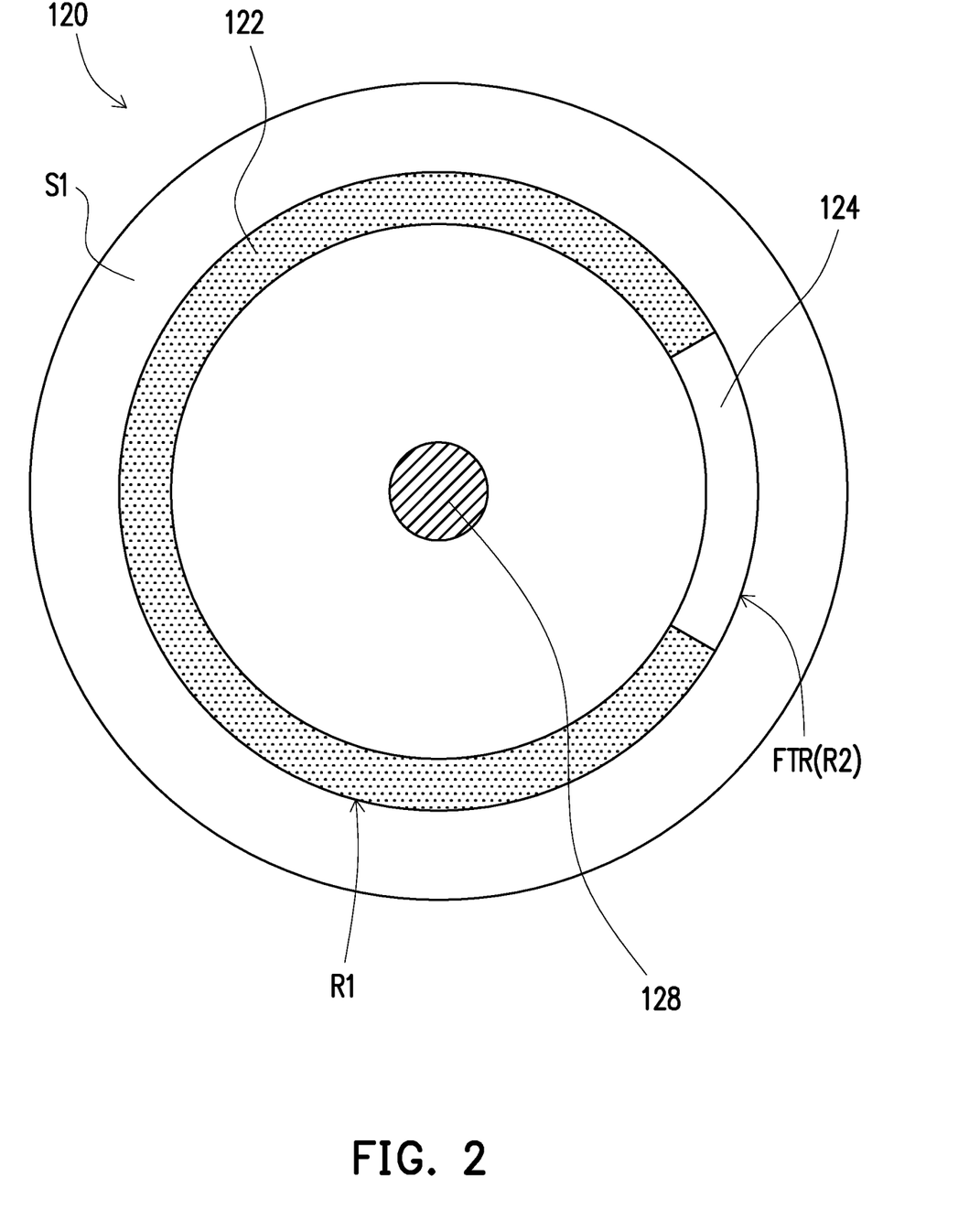
FIG. 2 is a top view of a wavelength conversion element in FIG. 1A and FIG. 1B.
Figure 3:
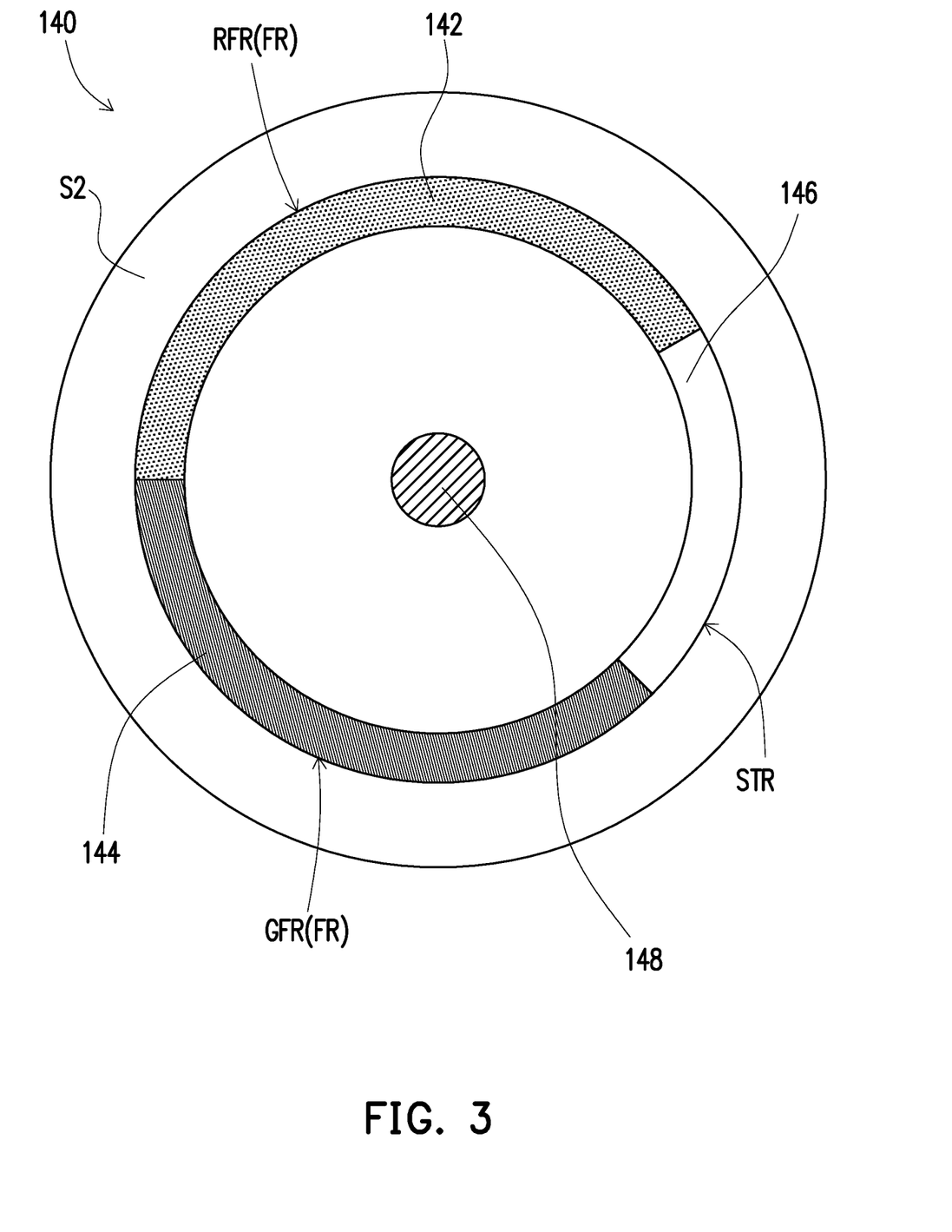
FIG. 3 is a top view of a filter element in FIG. 1A and FIG. 1B.

FIG. 1A is a schematic diagram of an optical path of a projection apparatus during a first time period according to an embodiment of the invention. FIG. 1B is a schematic diagram of an optical path of the projection apparatus of FIG. 1A during a second time period. FIG. 2 is a top view of a wavelength conversion element in FIG. 1A and FIG. 1B. FIG. 3 is a top view of a filter element in FIG. 1A and FIG. 1B.

Referring to FIG. 1A and FIG. 1B, in the embodiment, the projection apparatus 200 includes an illumination system 100, a light valve 210, a projection lens 220 and a light homogenization element 230. The illumination system 100 is used for outputting at least one color beam PB to the light valve 210. The illumination system 100 includes an excitation light source 110, a wavelength conversion element 120, a light splitting element 130 and a filter element 140. The above components are described in detail below.

The light valve 210 of the embodiment of the invention refers to any of spatial light modulators such as a Digital Micro-mirror Device (DMD), a Liquid-Crystal-On-Silicon (LCOS) panel or a Liquid Crystal Panel (LCD), etc. The light valve 210 is disposed on a transmission path of the at least one color beam PB, and is configured to convert the at least one color beam PB into an image beam IMB.

The projection lens 220 of the embodiment of the invention is, for example, a combination of one or a plurality of optical lenses having refracting power, and the optical lenses, for example, include various combinations of non-planar lenses such as a biconcave lens, a biconvex lens, a convex-concave lens, a concave-convex lens, a plano-convex lens, a plano-concave lens, etc. The type of the projection lens 220 is not limited by the invention. The projection lens 220 is disposed on a transmission path of the image beam IMB, and is configured to project the image beam IMB out of the projection apparatus 200.

The excitation light source 110 of the embodiment of the invention refers to a light source adapted to emit a short wavelength beam, and a peak wavelength of the short wavelength beam, for example, is ranged within a blue light wavelength range or an ultraviolet light wavelength range, where the peak wavelength is defined as a wavelength corresponding to the maximum light intensity. The excitation light source 110 includes a Laser Diode (LD), a Light-Emitting Diode (LED) or a matrix composed of one of the LDs and the LEDs, though the invention is not limited thereto. In the present embodiment, the excitation light source 110 is a laser light-emitting element including a laser diode. The excitation light source 110 is configured to emit an excitation beam EB. The excitation beam EB is, for example, a blue laser beam.

The wavelength conversion element 120 of the embodiment of the invention is an optical element adapted to convert the short wavelength beam passing through the wavelength conversion element 120 into a longer wavelength beam relative to the short wavelength beam. In the present embodiment, the wavelength conversion element 120 is a phosphor wheel, though the invention is not limited thereto. Referring to FIG. 1A, FIG. 1B and FIG. 2, in detail, the wavelength conversion element 120 includes a first substrate S1 and a first rotation shaft 128, and the wavelength conversion element 120 has a wavelength conversion region R1 and a light effect region R2, where the wavelength conversion region R1 and the light effect region R2 are disposed at different regions on the first substrate S1, and the wavelength conversion element 120 rotates around the first rotation shaft 128 such that the wavelength conversion region R1 and the light effect region R2 are cut into the transmission path of the excitation beam EB in turn. The wavelength conversion region R1 may convert the short wavelength beam transmitted to the wavelength conversion region R1 into a long wavelength beam. In the present embodiment, a wavelength conversion material 122 is disposed in the wavelength conversion region R1. The wavelength conversion material 122 is, for example, a yellow phosphor powder adapted to be excited such that a yellow light is output therefrom. Referring to FIG. 1A, when the excitation beam EB is transmitted to the wavelength conversion region R1, the excitation beam EB excites the wavelength conversion material 122 to emit a converted beam CB. The converted beam CB is, for example, a yellow beam. On the other hand, the light effect region R2 may optically effect on the beam transmitted to the light effect region R2 and then output it from the light effect region R2. In detail, the light effect region R2 is, for example, a first transparent region FTR. A transparent portion 124 is disposed in the first transparent region FTR. The optical effect is, for example, a light penetrating effect. The wavelength conversion material 122 and the transparent portion 124 are disposed on the first substrate S1. The first substrate S1 is, for example, a light-penetrating substrate. In other words, the phosphor wheel of the present embodiment is, for example, a transmissive phosphor wheel. Referring to FIG. 1B, when the excitation beam EB is transmitted to the first transparent region FTR, the excitation beam EB may penetrate through the first transparent region FTR and be output from the first transparent region FTR. In other embodiment, a diffusion structure or diffusion particles may disposed in the transparent portion 124, such that the excitation beam EB may evenly penetrate through the transparent portion 124.

The light splitting element 130 of the embodiment of the invention is an optical element having a light splitting function. In the present embodiment, the light splitting element is a Dichroic Mirror (DM), which has wavelength selectivity and may be a color separator used to separate beams according to wavelength/color. However, the invention is not limited thereto. In the present embodiment, the light splitting element 130 is designed to allow a blue beam to penetrate and is adapted to reflect a yellow beam and other color beams. The light splitting element 130 is disposed on transmission paths of the excitation beam EB and the converted beam CB, and allows the excitation beam EB to penetrate and reflects the converted beam CB.

The filter element 140 of the embodiment of the invention refers to an optical element that is adapted to filter out beams within a specific wavelength range while allow beams within another specific wavelength range to penetrate therethrough. Referring to FIG. 1A, FIG. 1B and FIG. 3, in the present embodiment, the filter element 140 is, for example, a filter wheel. The filter element 140 has at least one filter region FR, a second transparent region STR and a second rotation shaft 148. The at least one filter region FR, for example, includes two filter regions FR, which are, for example, a red filter region RFT and a green filter region GFT. A red filter 142 is disposed in the red light filter region RFR. A green light filter 144 is disposed in the green filter region GFT. The filter element 140 is disposed on transmission paths of the converted beam CB and the excitation beam EB passing through the light splitting element 130, and the filter element 140 allows a part of the converted beam CB to penetrate, outputs at least one color beam PB, and reflects another part CB' of the converted beam CB, where the filter element 140 also allows the excitation beam EB to penetrate, so as to form one color beam. Referring to FIG. 1A and FIG. 4, when the converted beam CB is transmitted to the red filter region RFR or the green filter region GFR, the converted beam CB is filtered to subsequently form a red beam or a green beam. When the excitation beam EB is transmitted to the second transparent region STR, the excitation beam EB penetrates through the second transparent region STR to form a blue beam. The second transparent region STR is configured with a transparent portion 146. The transparent portion 146 is, for example, a transparent material. The filter element 140 rotates around the second rotation shaft 148 such that the filter regions FR and the second transparent region STR are cut into the transmission paths of the converted beam CB and the excitation beam EF in turn, so as to correspondingly output the color beams.

The light homogenization element 230 of the embodiment of the invention refers to an optical element adapted to homogenize the beam passing through the light homogenization element 230. The light homogenization element 230 is disposed on a transmission path of the color beam PB coming from the filter element 140. In the present embodiment, the light homogenization element 230 is, for example, an integration rod, a lens array or other optical element having the light homogenizing effect, though the invention is not limited thereto.

Moreover, in the present embodiment, one or a plurality of reflection mirrors M1-M3 and focusing lenses C1-C6 may be selectively configured in interior of the projection apparatus 200, which are used for adjusting paths of the beams in interior of the projection apparatus 200. Moreover, an optical prism set OA may be selectively configured in interior of the projection apparatus 200, which is used for adjusting a path of the beam output by the illumination system 100.

Configuration relationships of the aforementioned components are described in detail below.

Referring to FIG. 1A and FIG. 1B, the wavelength conversion region R1 and the light effect region R2 of the wavelength conversion element 120 are disposed on the transmission path of the excitation beam EB. The light splitting element 130 is located between the excitation light source 110 and the wavelength conversion element 120. In the present embodiment, a reference plane RP is perpendicular to the transmission paths of the converted beam CB and the excitation beam EB coming from the wavelength conversion element 120, and the reference plane RP, for example, passes through a central axis CA of the filter element 140. The filter element 140 and the reference plane RP are angled such that an acute angle θ is formed there between. Further, as shown in FIG. 1A and FIG. 1B, a surface of the filter element 140 facing the light splitting element 130 is an incident surface for a light beam, and the incident surface of the filter element 140 is not perpendicular to the transmission paths of the converted beam CB and the excitation beam EB, but is angled at an acute angle θ with respect to the reference plane RP. In other words, the excitation beam EB or the converted beam CB is obliquely incident onto the incident surface of the filter element 140. The reflection mirrors M1-M3 are disposed on the transmission path of the excitation beam EB. The focusing lenses C1-C6 are disposed on the transmission path of the excitation beam EB. The focusing lens C5 is further disposed on the transmission path of the converted beam CB. The focusing lens C6 is disposed on the transmission path of the color beam PB. The light homogenization element 230 is disposed on the transmission path of the at least one color beam PB. The light homogenization element 230 is located between the filter element 140 and the light valve 210. The optical prism set OA is disposed on the transmission path of the color beam PB coming from the light homogenization element 230, and is disposed between the projection lens 220 and the light valve 210.

A driving element of the wavelength conversion element 120 drives the wavelength conversion region R1 and the light effect region R2 to rotate about the first rotation shaft 128 and sequentially cut into the transmission path of the excitation beam EB. In the present embodiment, in the projection apparatus 200, by synchronously rotating the wavelength conversion element 120 and the filter element 140, at least one filter region FR of the filter element 140 corresponds to the wavelength conversion region R1 of the wavelength conversion element 120, and the second transparent region STR of the filter element 140 corresponds to the light effect region R2 of the wavelength conversion element 120. Namely, the converted beam CB coming from the wavelength conversion region R1 may pass through at least one filter region FR, and the excitation beam EB output from the light effect region R2 may pass through the second transparent region STR.

Optical transmission in the projection apparatus 200 are described in detail below.

Referring to FIG. 1A, the excitation beam EB is emitted by the excitation light source 110, and penetrates through the light splitting element 130, and is transmitted to the wavelength conversion element 120. During a first time period, the wavelength conversion region R1 is cut into the transmission path of the excitation beam EB. The wavelength conversion region R1 is excited by the excitation beam EB to emit the converted beam CB. The converted beam CB is reflected by the wavelength conversion region R1 and transmitted to the light splitting element 130. Then, the converted beam CB is reflected by the light splitting element 130 and transmitted to the filter element 140. At this moment, at least one filter region FR of the filter element 140 is cut into the transmission path of the converted beam CB. The converted beam CB penetrates through the focusing lens C5 and is converged to at least one filter region FR by the focusing lens C5. A part of the converted beam CB penetrates through the at least one filter region FR to correspondingly output as at least one color beam PB, for example, a red beam or a green beam. Then, the color beam PB is transmitted to the light homogenization element 230, and is homogenized by the light homogenization element 230. The color beam PB coming from the light homogenization element 230 is directed to the light valve 210 by the optical prism set OA. The light valve 210 converts the color beam PB into an image beam IMB. The projection lens 220 projects the image beam IMB to a projection medium (for example, a projection screen that is not shown) to form an image.

On the other hand, since the transmission path of the converted beam CB is perpendicular to the reference plane RP, and the reference plane RP and the filter element 140 are angled such that an acute angle θ is formed there between. In other words, the filter element 140 is inclined relative to the transmission path of the converted beam CB, a part of the converted beam CB passes through the filter element 140 to output as the color beam PB, and another part CB' of the converted beam CB is reflected by at least one filter region FR, and may be not subjected to be transmitted back to the wavelength conversion region R1 of the wavelength conversion element 120 along the coming path of the converted beam CB.

Referring to FIG. 1B, the excitation beam EB is emitted by the excitation light source 110, and passes through the light splitting element 130, and is transmitted to the wavelength conversion element 120. During a second time period, the first transparent region FTR is cut into the transmission path of the excitation beam EB. The excitation beam EB passes through the first transparent region FTR and is output from the first transparent region FTR, and sequentially passes through the reflection mirrors M1-M3 and the focusing lenses C1-C4, and then again penetrates through the light splitting element 130 and the focusing lens C5 in another direction, and is transmitted to the filter element 140. At this moment, the second transparent region STR of the filter element 140 is cut into the transmission path of the excitation beam EB. The second transparent region STR outputs the excitation beam EB as the color beam PB, for example, a blue beam. Since the transmission path of the excitation beam EB is perpendicular to the reference plane RP, and the reference plane RP and the filter element 140 are angled such that an acute angle θ is formed there between, when a small part of the excitation beam EB is incident onto the filter element 140 by a large incident angle, the part of the excitation beam EB is reflected by the filter element 140 without being transmitted back to the wavelength conversion element 120 along the coming path of the excitation beam EB. An optical transmission of the color beam PB during the second time period is similar to the optical transmission of the color beam PB during the first time period, and detail thereof is not repeated.

According to the above description, in the illumination system 100 and the projection apparatus 200 of the present embodiment, since the transmission paths of the converted beam CB and the excitation beam EB are perpendicular to the reference plane RP, and the reference plane RP and the filter element 140 are angled such that an acute angle θ is formed there between, a part CB' of the converted beam CB is reflected to somewhere else by at least one filter region FR and may be not subjected to be transmitted back to the wavelength conversion region R1 along the coming path. Through the above configuration, the wavelength conversion region R1 may be not subjected to receive the part CB' of the converted beam CB reflected by the filter element 140, so that the conversion efficiency of the wavelength conversion region R1 may be not subjected to reduce due to heat. Therefore, the illumination system 100 and the projection apparatus 200 of the embodiment have good reliability and good optical efficiency.

When the acute angle θ is ranged between 1 degree and 20 degrees, most of the converted beam CB may be filtered by the at least one filter region FR to form the at least color beam PB, and the small part of the converted beam CB' is reflected by the filter region FR, so that the illumination system 100 and the projection apparatus 200 of the embodiment may maintain a certain optical efficiency.

It should be noted that that a part of contents of the aforementioned embodiment is also used in the following embodiment, wherein the same reference numbers denote the same or like components, and descriptions of the same technical contents are omitted. The aforementioned embodiment can be referred for descriptions of the omitted parts, and detailed descriptions thereof are not repeated in the following embodiment.

Figure 4A:
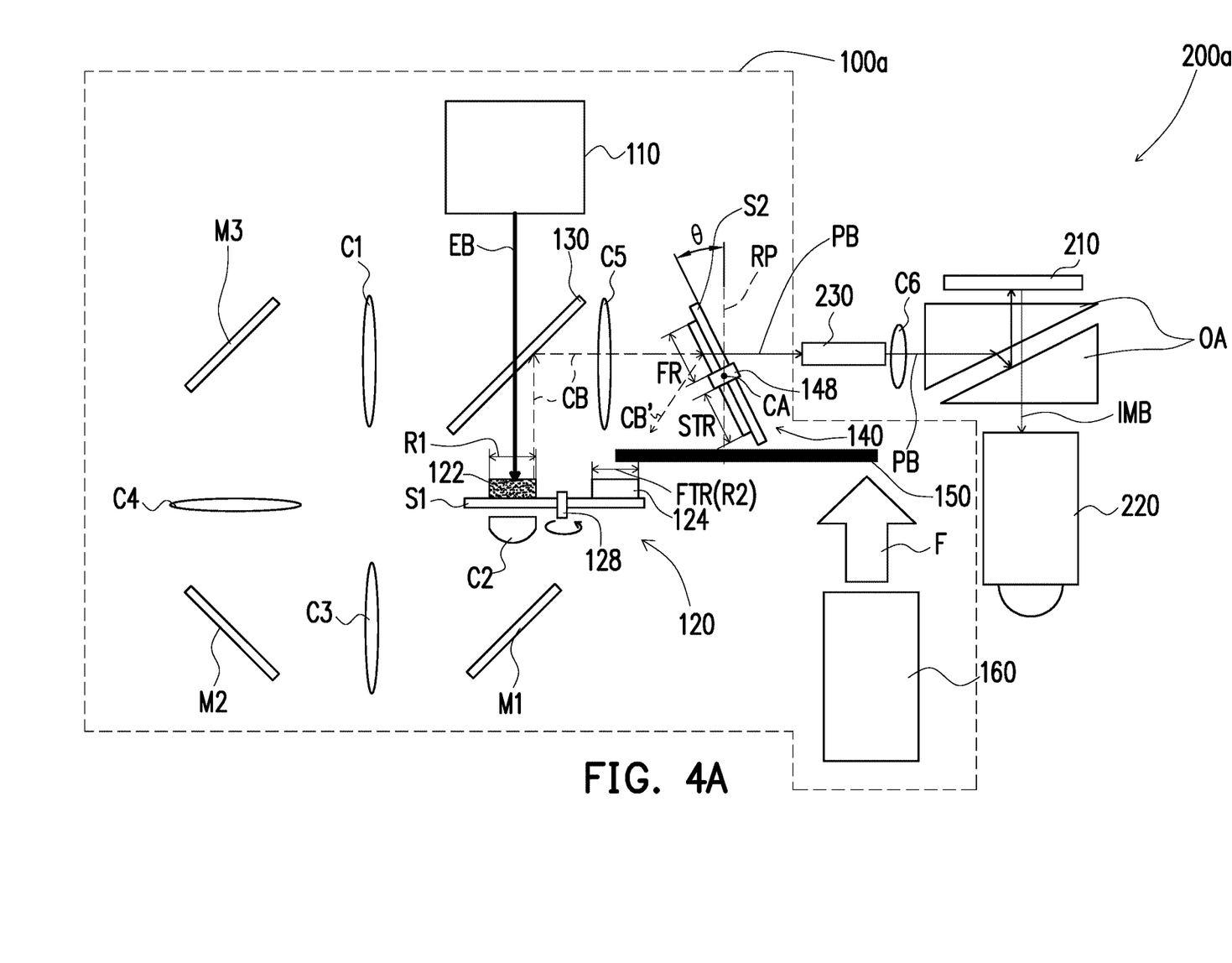
FIG. 4A is a schematic diagram of an optical path of a projection apparatus during a first time period according to another embodiment of the invention.
Figure 4B:
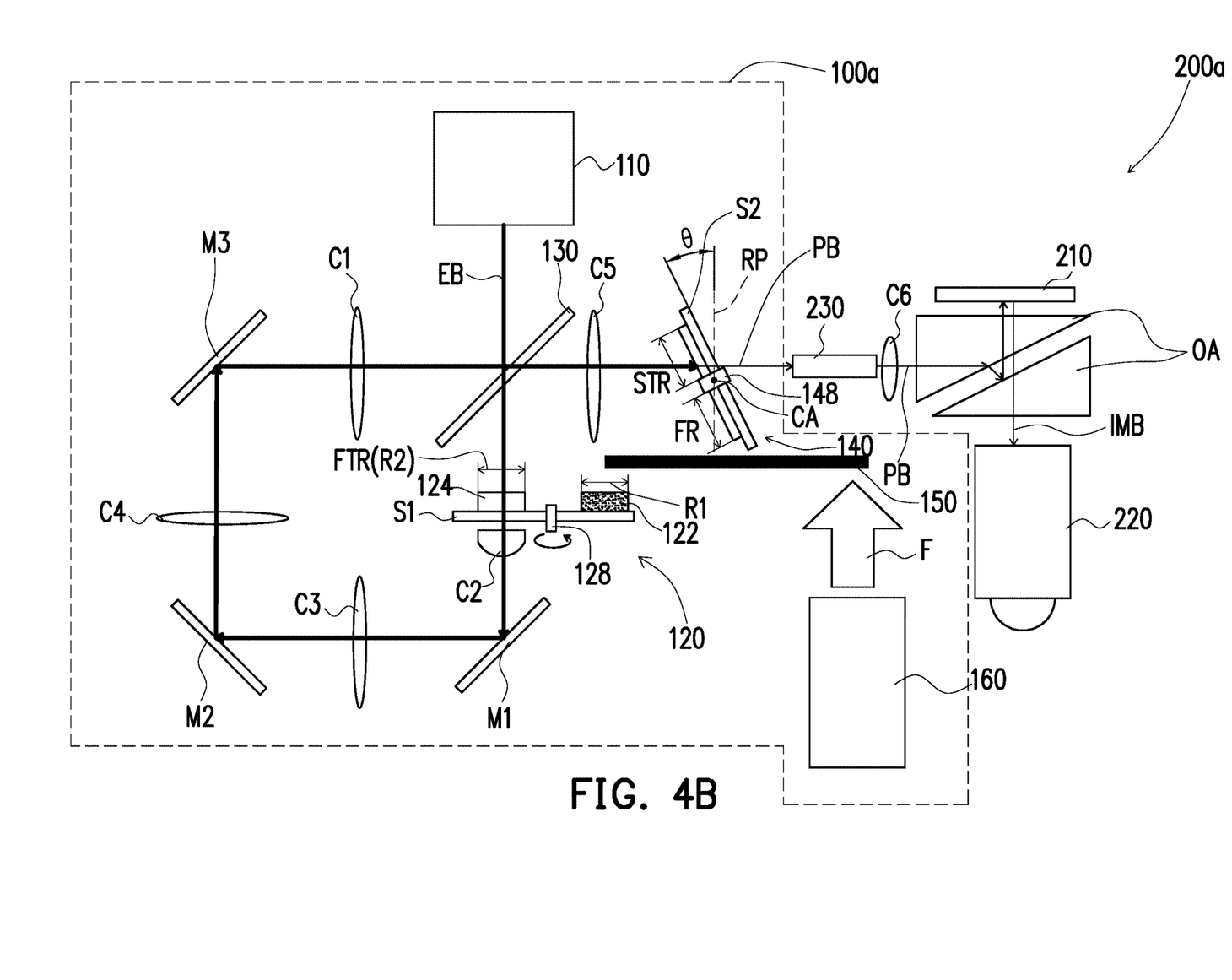
FIG. 4B is a schematic diagram of an optical path of the projection apparatus of FIG. 4A during a second time period.

FIG. 4A is a schematic diagram of an optical path of a projection apparatus during a first time period according to another embodiment of the invention. FIG. 4B is a schematic diagram of an optical path of the projection apparatus of FIG. 4A during a second time period.

Referring to the projection apparatus 200a of FIG. 4A and FIG. 4B, the projection apparatus 200a is substantially similar to the projection apparatus 200 of FIG. 1A and FIG. 1B, and main difference thereof in framework is that the illumination system 100a further includes a light absorbing element 150 and a fan 160. The light absorbing element 150 is disposed beside the filter element 140. To be specific, the light absorbing element 150 is not disposed on the transmission path of the excitation beam EB or that of the converted beam CB coming from the wavelength conversion element 120, but is disposed on the transmission path of the converted beam CB' reflected by the filter element 140 or that of the excitation beam EB reflected by the filter element 140. In the present embodiment, the light absorbing element 150 refers to an optical element having a light absorbing function. To be specific, the light absorbing element 150 is, for example, a metal block with a rough surface and plated with a black coating. The fan 160 is disposed beside the light absorbing element 150, and is used for providing a cooling airflow F to the light absorbing element 150. The airflow F of the fan 160 may cool down the light absorbing element 150 which is used to absorb the reflected beams.

An optical transmission of each of the beams in FIG. 4A and FIG. 4B is similar to that in FIG. 1A and FIG. 1B, and detail thereof is not repeated, and a difference there between is that the light absorbing element 150 is used for absorbing the other part CB' of the converted beam CB reflected by the filter element 140.

According to the above description, due to configuration of the light absorbing element 150, the illumination system 100a and the projection apparatus 200a of the present embodiment may avoid a stray light formed by the other part CB' of the converted beam CB in interior thereof compared to the illumination system 100 and the projection apparatus 200 of the embodiment of FIGS. 1A and IG. 1B, so as to improve the overall optical quality. Moreover, the cooling airflow F provided by the fan 160 may decrease a temperature of the light absorbing element 150, so as to effectively dissipate heat.

Figure 5A:
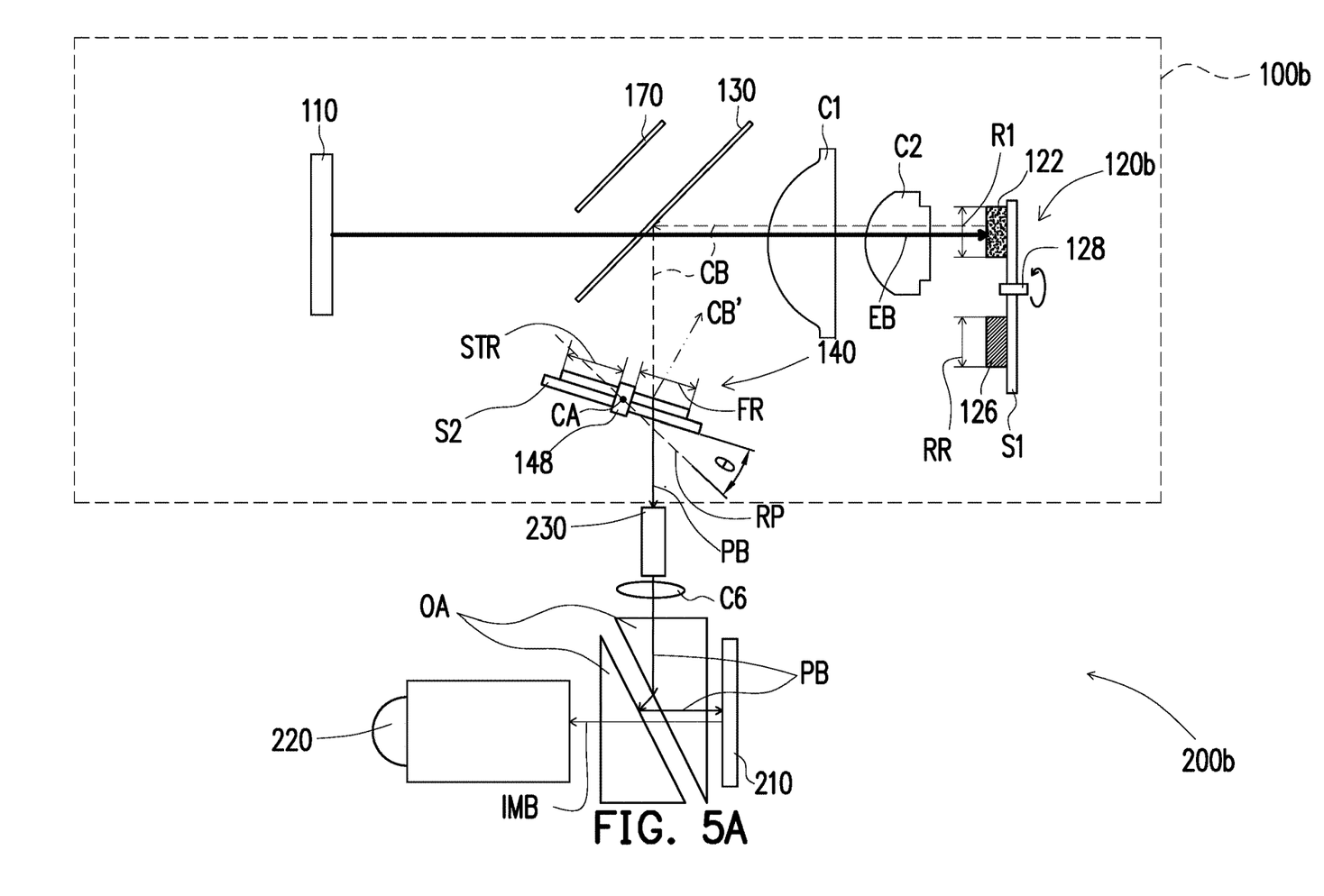
FIG. 5A is a schematic diagram of an optical path of a projection apparatus during a first time period according to another embodiment of the invention.
Figure 5B:
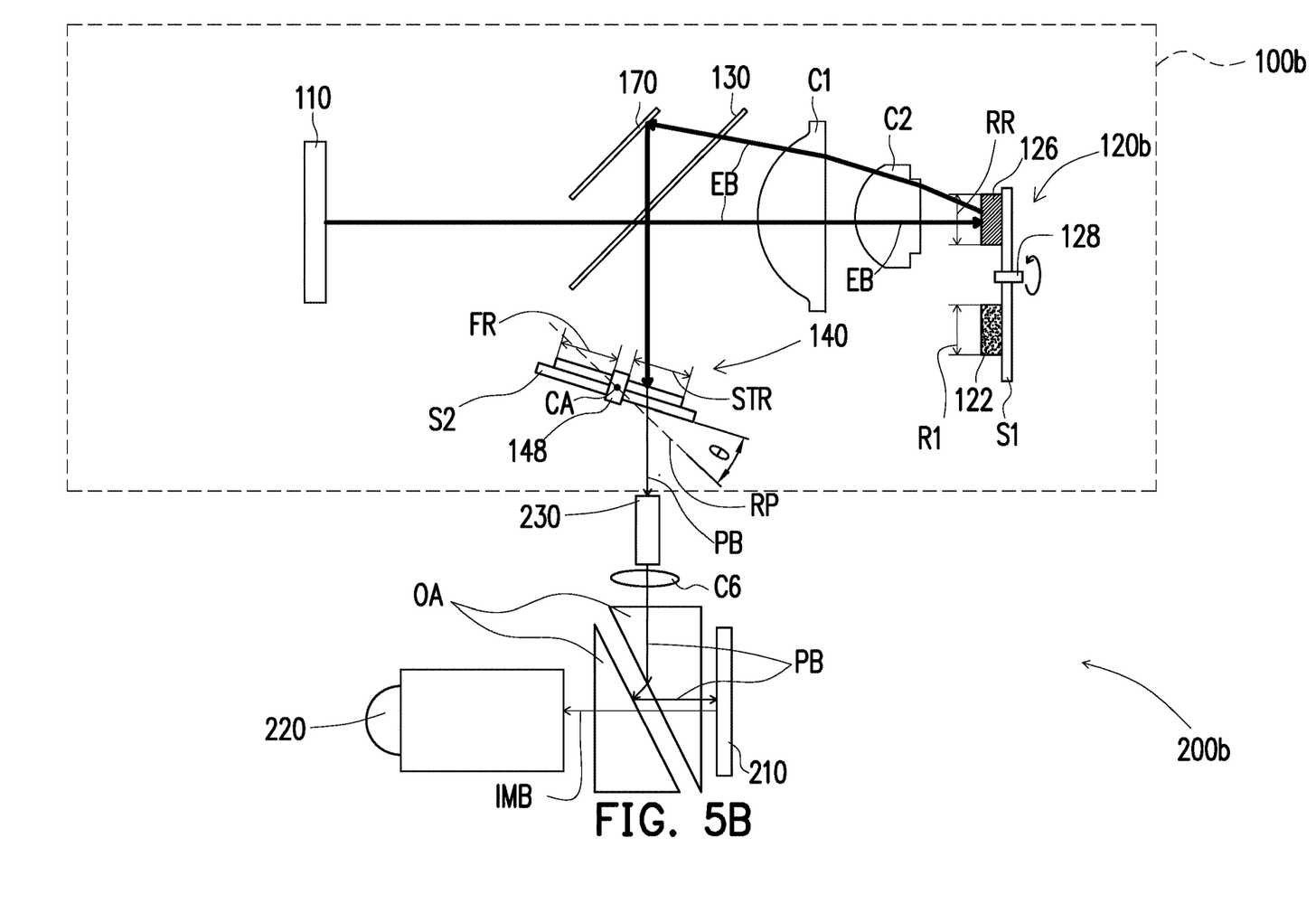
FIG. 5B is a schematic diagram of an optical path of the projection apparatus of FIG. 5A during a second time period.

FIG. 5A is a schematic diagram of an optical path of a projection apparatus during a first time period according to another embodiment of the invention. FIG. 5B is a schematic diagram of an optical path of the projection apparatus of FIG. 5A during a second time period.

Referring to the projection apparatus 200b of FIG. 5A and FIG. 5B, the projection apparatus 200b is substantially similar to the projection apparatus 200 of FIG. 1A and FIG. 1B, and main difference thereof in framework is that the illumination system 100b further includes another light splitting element 170. The light splitting element 170 is designed to be adapted to reflect all of the color beams. Moreover, the light effect region R2 of the wavelength conversion element 120b is a reflection region RR. The reflection region RR is configured with a reflection portion 126, which is used for reflecting the excitation beam EB. The optical function of the light effect region R2 is the reflection function. In other words, the wavelength conversion element 120b of the present embodiment is, for example, a reflective phosphor wheel. Moreover, in the illumination system 100b, the focusing lenses C3-C5 and the reflection mirrors M1-M3 are omitted.

The main differences between the projection apparatus 200b of FIG. 5A and FIG. 5B and the projection apparatus 200 of FIG. 1A and FIG. 1B are described below.

The wavelength conversion region R1 and the reflection region RR of the wavelength conversion element 120b are disposed on the transmission path of the excitation beam EB. The light splitting element 130 is disposed on the transmission path of the excitation beam EB, and the light splitting element 130 is disposed between the wavelength conversion element 120b and the excitation light source 110 and is located on the transmission paths of the excitation beam EB and the converted beam CB, allows the excitation beam EB to penetrate, and reflects the converted beam CB. The light splitting element 170 is disposed on the transmission path of the reflected excitation beam EB and located between the excitation light source 110 and the light splitting element 130, and is used for reflecting the excitation beam EB coming from the reflection region RR.

The optical transmission of the projection apparatus 200b is described below.

The optical transmission of each of the beams in FIG. 5A is similar to that in FIG. 1A, and detail thereof is not repeated. The optical transmission of each of the beams in FIG. 5A is substantially similar to that in FIG. 1A, and a main difference there between is that the excitation beam EB coming from the excitation light source 110 passes through a part region of the light splitting element 130 (for example, a lower part region of the light splitting element 130 in FIG. 5A and FIG. 5B), and is transmitted to the wavelength conversion element 120b. During the second time period, the reflection region RR is cut into the transmission path of the excitation beam EB. The excitation beam EB is reflected by the reflection region RR and is output from the reflection region RR, and then the excitation beam EB penetrates through another part region of the light splitting element 130 (for example, an upper part region of the light splitting element 130 in FIG. 5B), and is transmitted to the light splitting element 170. The excitation beam EB is reflected by the light splitting element 170 and is transmitted to the filter element 140. At this moment, the second transparent region STR of the filter element 140 is cut into the transmission path of the excitation beam EB. The second transparent region STR outputs the excitation beam EB to form the color beam PB. The subsequent optical transmission of the color beam PB is similar to the optical transmission of the color beam PB of FIG. 1B, and detail thereof is not repeated.

In summary, in the illumination system and the projection apparatus of the invention, since the transmission path of the converted beam is perpendicular to the reference plane, and the reference plane and the filter element are angled such that the acute angle is formed there between, a part of the converted beam is reflected to somewhere else in the system and is not easy to be transmitted back to the wavelength conversion region of the wavelengths conversion element along the coming path. Through the above configuration, the wavelength conversion material of the wavelength conversion region is not easy to receive the converted beam reflected by the filter element, and the conversion efficiency thereof may be not subjected to decrease due to heat/high temperature. Therefore, the illumination system and the projection apparatus of the invention have good reliability and good optical efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
   an excitation light source, configured to emit an excitation beam;
   a wavelength conversion element, having a wavelength conversion region, wherein when the wavelength conversion region is cut into a transmission path of the excitation beam, the wavelength conversion region is excited by the excitation beam to emit a converted beam;
   a filter element, disposed on a transmission path of the converted beam coming from the wavelength conversion element, wherein a reference plane is perpendicular to the transmission path of the converted beam coming from the wavelength conversion element, the filter element and the reference plane are angled such that an acute angle is formed there between, the filter element allows a part of the converted beam to penetrate so as to output at least one color beam, and the filter element reflects another part of the converted beam;
   a light absorbing element, disposed beside the filter element; and
   a fan, disposed beside the light absorbing element, wherein the fan is configured to provide a cooling airflow to the light absorbing element.

2. The illumination system as claimed in claim 1, wherein the acute angle is ranged from 1 degree to 20 degrees.

3. The illumination system as claimed in claim 1, wherein the wavelength conversion element further has a light effect region, the wavelength conversion region and the light effect region are sequentially cut into the transmission path of the excitation beam, and when the light effect region is cut into the transmission path of the excitation beam, the excitation beam is output from the light effect region.

4. The illumination system as claimed in claim 3, wherein the light effect region is a first transparent region, and during a first time period, the wavelength conversion region is cut into the transmission path of the excitation beam, and during a second time period, the first transparent region is cut into the transmission path of the excitation beam, and the excitation beam penetrates through the first transparent region and is output from the first transparent region.

5. The illumination system as claimed in claim 3, wherein the light effect region is a reflection region, during a first time period, the wavelength conversion region is cut into the transmission path of the excitation beam, and during a second time period, the reflection region is cut into the transmission path of the excitation beam, and the excitation beam is reflected by the reflection region and is output from the reflection region.

6. The illumination system as claimed in claim 1, further comprising a light splitting element disposed on transmission paths of the excitation beam and the converted beam, and located between the excitation light source and the wavelength conversion element, wherein the light splitting element is configured to transmit the converted beam to the filter element.

7. The illumination system as claimed in claim 1, wherein the filer element is a filter wheel, and the filter wheel further comprises at least one filter region, wherein
   when the at least one filter region is cut into the transmission path of the converted beam, the at least one filter region correspondingly outputs the at least one color beam.

8. The illumination system as claimed in claim 3, wherein the filer element is a filter wheel and is located on the transmission path of the excitation beam coming from the light effect region, and the filter wheel further comprises at least one filter region and a second transparent region, wherein
   when the at least one filter region is cut into the transmission path of the converted beam, the at least one filter region correspondingly outputs the at least one color beam;
   when the second transparent region is cut into the transmission path of the excitation beam, the second transparent region outputs the excitation beam.

9. The illumination system as claimed in claim 1, wherein the light absorbing element is configured to absorb the another part of the converted beam reflected by the filter element.

10. A projection apparatus, comprising:
    an illumination system, comprising:
      an excitation light source, configured to emit an excitation beam;
      a wavelength conversion element, having a wavelength conversion region, wherein when the wavelength conversion region is cut into a transmission path of the excitation beam, the wavelength conversion region is excited by the excitation beam to emit a converted beam; and
      a filter element, disposed on a transmission path of the converted beam coming from the wavelength conversion element, wherein a reference plane is perpendicular to the transmission path of the converted beam, and the filter element and the reference plane are angled such that an acute angle is formed there between, the filter element allows a part of the converted beam to penetrate so as to output at least one color beam, and reflects another part of the converted beam;
    a light valve, disposed on a transmission path of the at least one color beam, and configured to convert the at least one color beam into an image beam;
    a projection lens, disposed on a transmission path of the image beam;
    a light absorbing element, disposed beside the filter element; and
    a fan, disposed beside the light absorbing element, and the fan is configured to provide a cooling airflow to the light absorbing element.

11. The projection apparatus as claimed in claim 10, wherein the acute angle is ranged from 1 degree to 20 degrees.

12. The projection apparatus as claimed in claim 10, wherein the wavelength conversion element further has a light effect region, the wavelength conversion region and the light effect region are sequentially cut into the transmission path of the excitation beam, and when the light effect region is cut into the transmission path of the excitation beam, the excitation beam is output from the light effect region.

13. The projection apparatus as claimed in claim 12, wherein the light effect region is a first transparent region, and during a first time period, the wavelength conversion region is cut into the transmission path of the excitation beam, and during a second time period, the first transparent region is cut into the transmission path of the excitation beam, and the excitation beam penetrates through the first transparent region and is output from the first transparent region.

14. The projection apparatus as claimed in claim 12, wherein the light effect region is a reflection region, during a first time period, the wavelength conversion region is cut into the transmission path of the excitation beam, and during a second time period, the reflection region is cut into the transmission path of the excitation beam, and the excitation beam is reflected by the reflection region and is output from the reflection region.

15. The projection apparatus as claimed in claim 10, wherein the illumination system further comprises a light splitting element disposed on transmission paths of the excitation beam and the converted beam, and located between the excitation light source and the wavelength conversion element, wherein the light splitting element is configured to transmit the converted beam to the filter element.

16. The projection apparatus as claimed in claim 10, wherein the filer element is a filter wheel, and the filter wheel further comprises at least one filter region, wherein
when the at least one filter region is cut into the transmission path of the converted beam, the at least one filter region correspondingly outputs the at least one color beam.

17. The projection apparatus as claimed in claim 12, wherein the filer element is a filter wheel and is located on the transmission path of the excitation beam coming from the light effect region, and the filter wheel further comprises at least one filter region and a second transparent region,
wherein,
when the at least one filter region is cut into the transmission path of the converted beam, the at least one filter region correspondingly outputs the at least one color beam;
when the second transparent region is cut into the transmission path of the excitation beam, the second transparent region outputs the excitation beam.

18. The projection apparatus as claimed in claim 10, wherein the light absorbing element is configured to absorb the another part of the converted beam reflected by the filter element.

* * * * *